G. E. JACKSON.
BALING PRESS.
APPLICATION FILED JUNE 9, 1909.
967,926.
Patented Aug. 23, 1910.
6 SHEETS—SHEET 5.
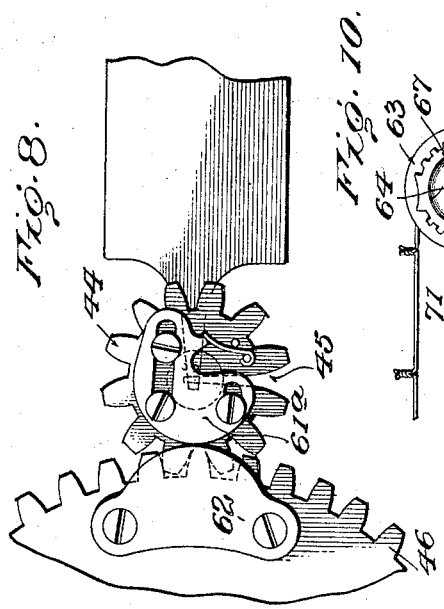
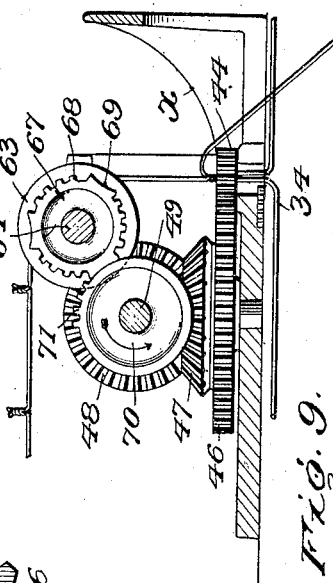
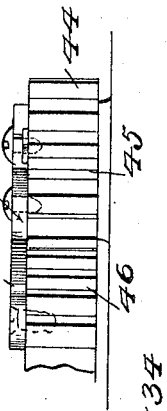
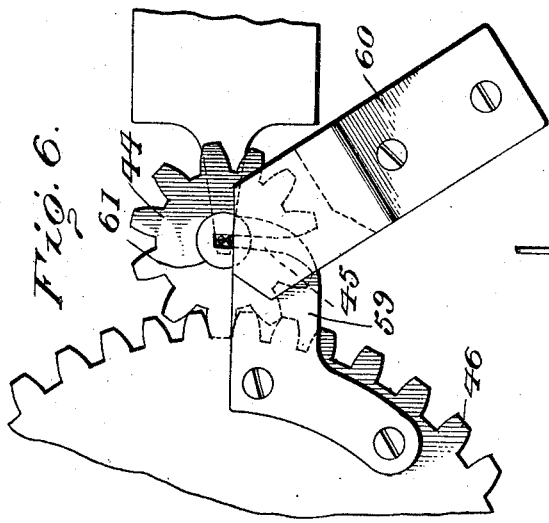
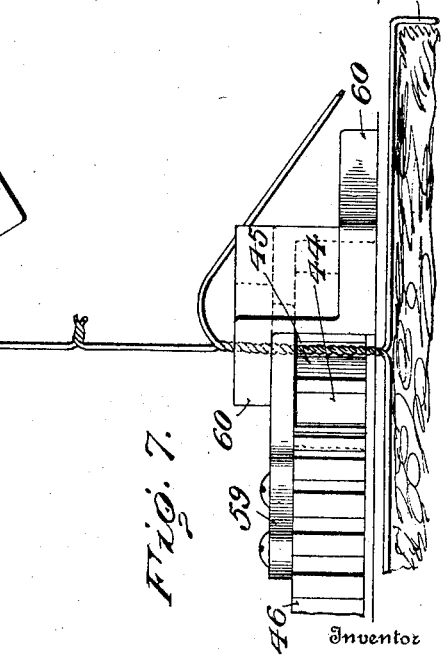
Witnesses
Juana M. Fallin
W. N. Woodson
Inventor
G. E. Jackson
By
Macey, Attorneys.

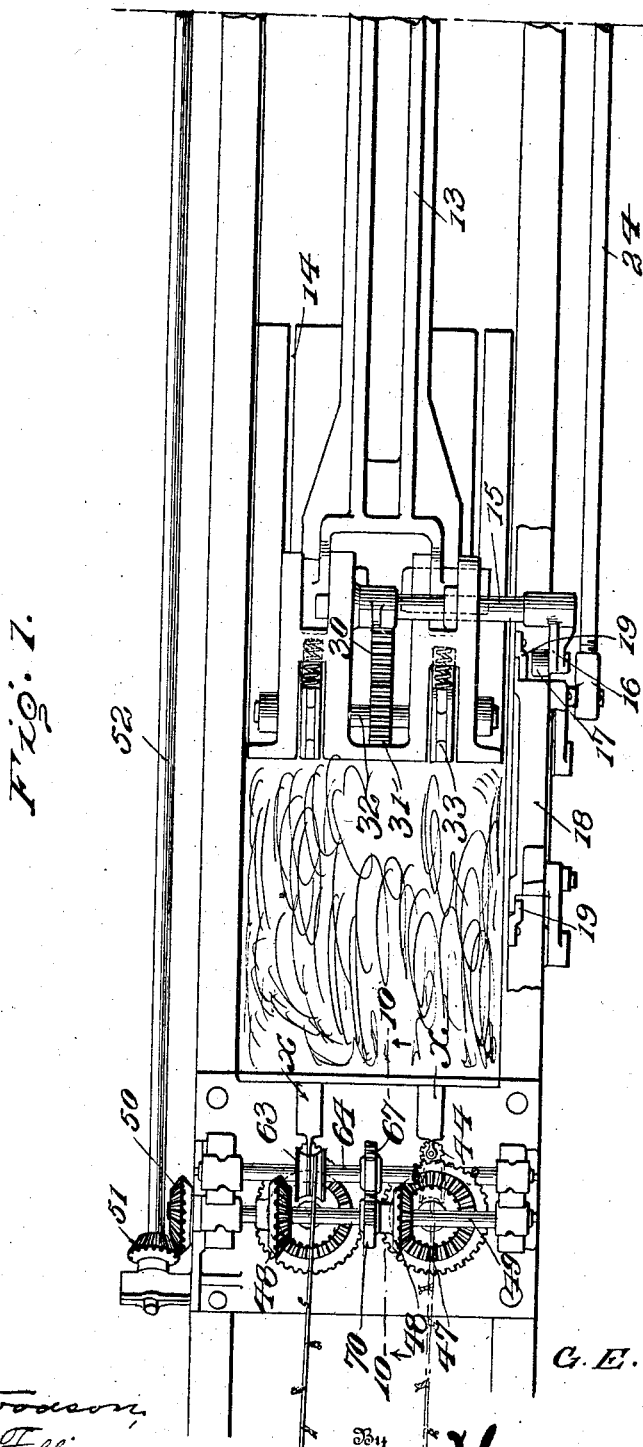

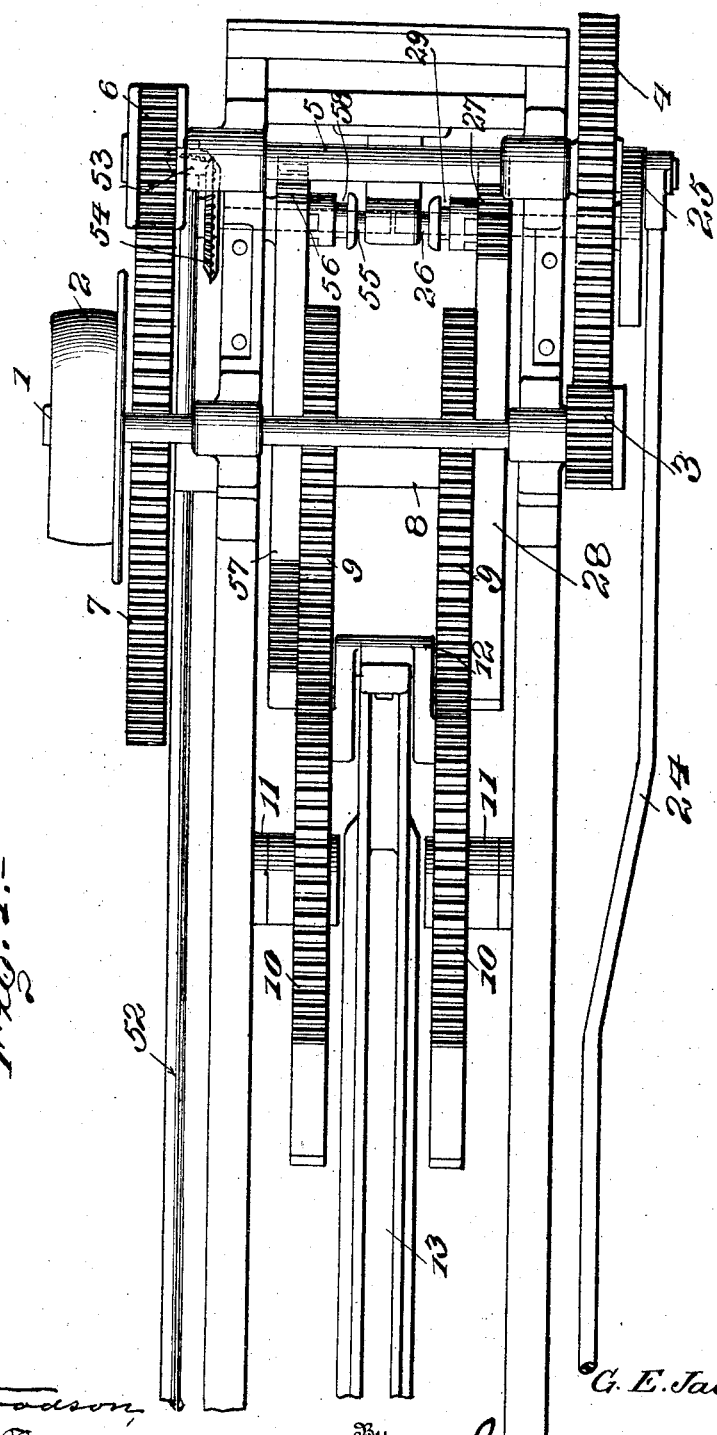

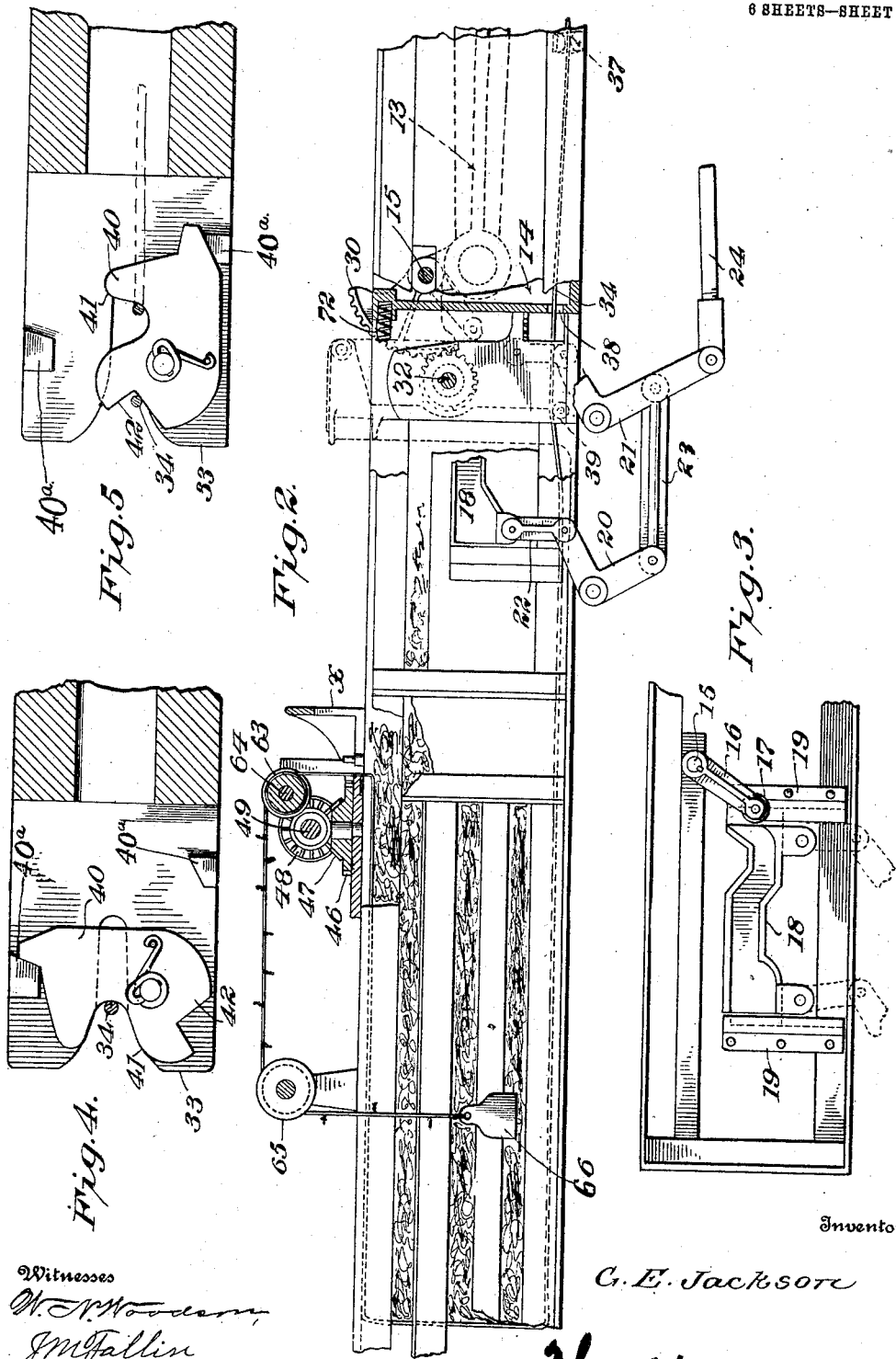

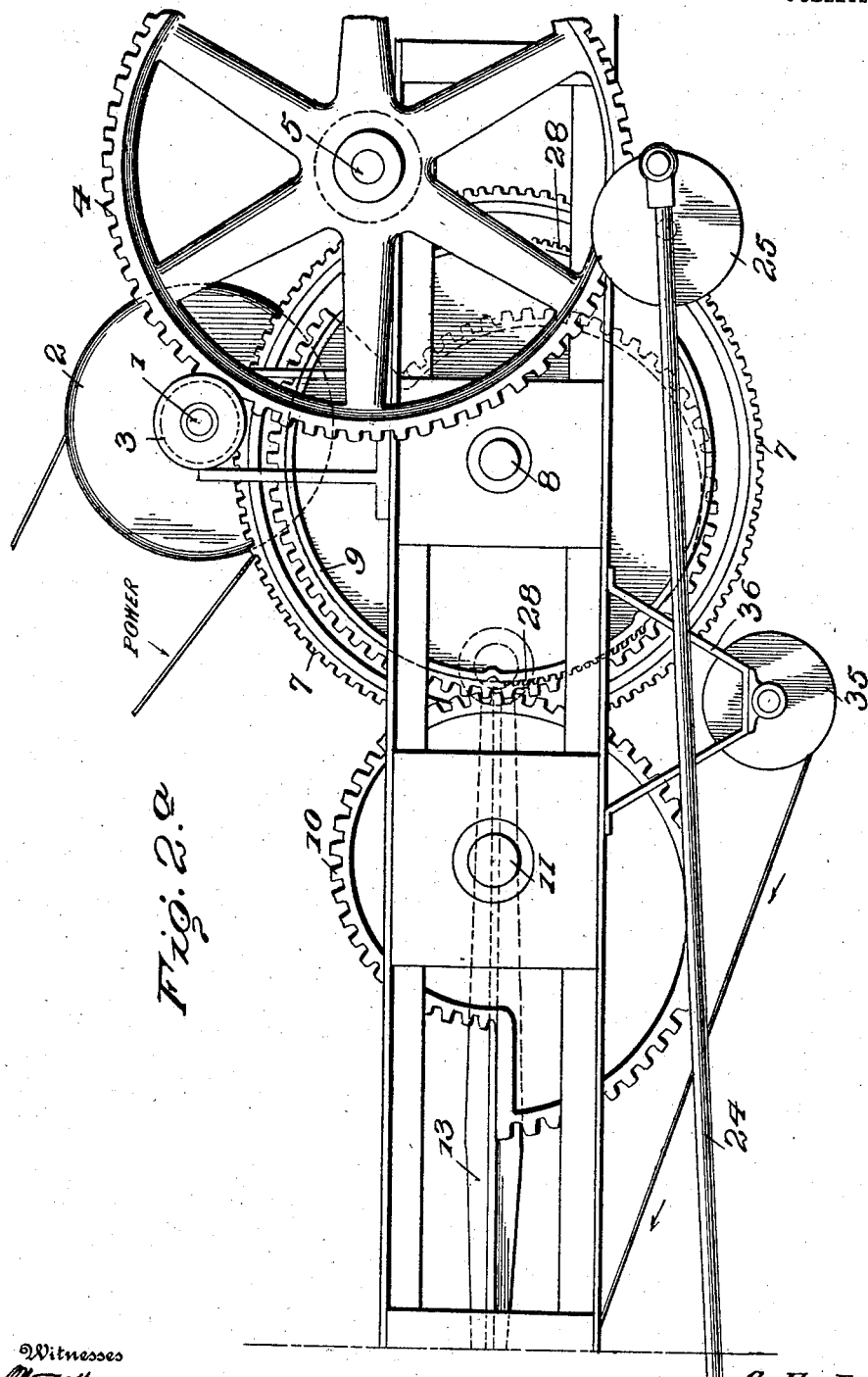

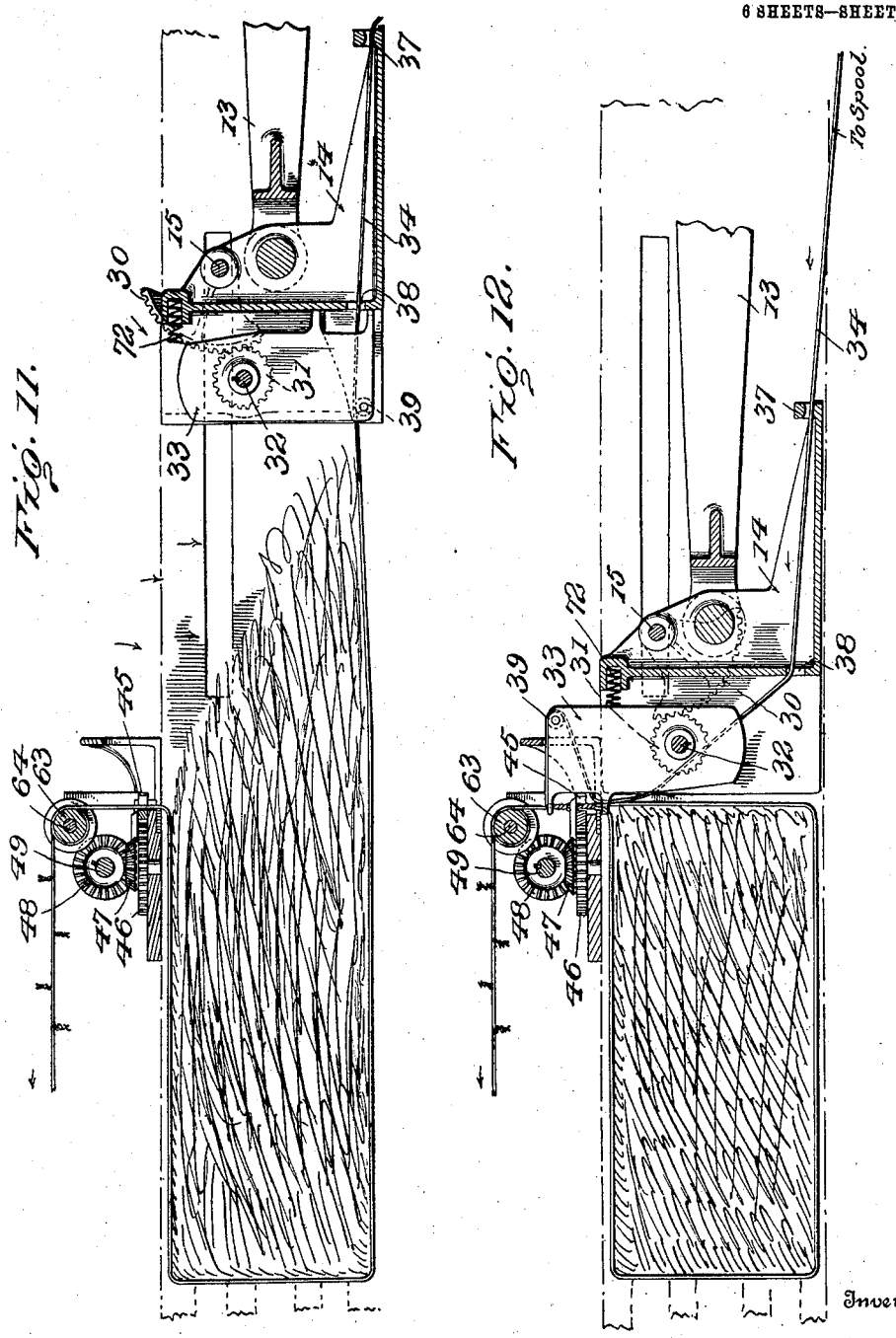

UNITED STATES PATENT OFFICE.

GEORGE E. JACKSON, OF NEWTON, IOWA.

BALING-PRESS.

967,926.  Specification of Letters Patent.  Patented Aug. 23, 1910.

Application filed June 9, 1909. Serial No. 501,085.

*To all whom it may concern:*

Be it known that I, GEORGE E. JACKSON, citizen of the United States, residing at Newton, in the county of Jasper and State of Iowa, have invented certain new and useful Improvements in Baling-Presses, of which the following is a specification.

This invention comprehends certain new and useful improvements in presses for baling hay or similar materials.

One of the primary objects of the invention is a baling press in which the parts are so arranged that the plunger will have a relatively quick return motion and a slow forward motion so as to leave the feed opening of the press open for a comparatively long time, thereby giving the packing fork or feeder more time to operate, and whereby also there will be a maximum power at the compressing end of the stroke of the plunger, which is the time when the greatest pressure is required, the "load" being evenly distributed all over the machine and avoiding any undue strain upon the gearing, and also thereby permitting relatively light gears to be employed.

The invention also has for its object a combined twister and wire cutter which will operate effectively to twist the strands of wire tightly around the bale and subsequently cut the wire and permit a portion thereof to pass out with the bale, and also a combined wire holder and drum, of novel and useful construction for carrying away the waste wire, the said wire holder and drum embodying positive actuating mechanism which operates intermittently to carry off this waste wire and securely hold one end of the wire as the bale is being formed.

A further object of the invention is an improved construction of needles which are carried by the plunger or ram of the press, and which are combined with novel actuating mechanism whereby the wires may be quickly carried upwardly around the rear side of the bale and into the twisters, the needles being so arranged that near the limit of the stroke of the plunger in compressing the hay or the like the needles will yield and permit the plunger to have a slight independent movement in a forward direction so as to effect the final compression while the needles remain relatively stationary and the twisters operate to twist the wire around the bale. And a further object of the invention is a baling press which will be comparatively light and yet strong and durable and which will be composed of comparatively few parts that may be easily manufactured and readily assembled, and which will operate efficiently and automatically in all the necessary steps, after the wires have once been threaded through the needles and secured to the combined wire holders and drums for carrying away the waste wire.

With these and other objects in view as will more fully appear as the description proceeds, the invention consists in certain constructions, arrangements and combinations of the parts that I shall hereinafter fully describe and claim.

For a full understanding of the invention reference is to be had to the following description and accompanying drawings in which:

Figure 1 is top plan view of one portion of a baling press constructed in accordance with my invention; Fig. 1ª is a similar view of another portion of the press and the main driving gears; Fig. 2 is a side elevation of a portion of the press parts being shown in section: Fig. 2ª is a side elevation of the rear end of the press. Fig. 3 is a detail side view of a part of the mechanism for actuating the needles, or wire carriers: Figs. 4 and 5 are detail sectional views of a portion of the needles showing the pivoted fingers thereof; in different positions in these two views respectively; Figs. 6 and 7 are detail top plan and edge views of one of the wire twisters and cutters; Figs. 8 and 9 are similar views of another form of cutting mechanism; and, Fig. 10 is a transverse sectional view on an enlarged scale, the section being taken substantially on the line 10—10 of Fig. 1 looking in the direction of the arrows; and, Figs. 11 and 12 are longitudinal sectional views through the baling chamber illustrating the wire carrying needles in different positions respectively.

Corresponding and like parts are referred to in the following description and indicated in all the views of the accompanying drawings by the same reference characters.

The framework of my improved baling press may be of any desired construction and design, and is preferably mounted upon traveling wheels (not shown) so that it may be moved conveniently from place to place wherever it is desired that the baling operation shall be performed. Near the rear end of the framework the driving shaft 1 is journaled, said shaft carrying at one end a driving pulley 2 by which it may receive its motion from any suitable source of power, and carrying at its other end a spur pinion 3 which meshes with a relatively large spur gear wheel 4 on one end of a countershaft 5. The said counter shaft carries at its opposite end a spur pinion 6, which meshes with a gear wheel 7 on one end of a transverse shaft 8, the said last named shaft carrying scroll gears 9 which mesh with corresponding gears 10 carried by stub shafts 11. The scroll gears 10 are provided with a double crank 12 to which one end of a pitman 13 is connected, the opposite end of the pitman having a jointed connection with the plunger or ram 14. By the arrangement of scroll gears herein shown and described, it is obvious that the plunger will have a relatively slow forward motion, and a quicker return movement. In the present proportion of parts, the return stroke is completed in 130° of a revolution of the scroll gears 9 and the baling stroke in 230°, the gain thus effected being used on the baling stroke, and the quick return leaving the opening of the press clear for a maximum amount of time so as to give the packing fork (not shown) and other parts of the feeding mechanism a longer time in which to pack the press preparatory to the compressing of the material into a bale.

A transversely extending shaft 15 is journaled in the plunger 14 and extends outwardly as best seen in Fig. 1 to one side of the press, the said shaft carrying at its projecting end a crank 16 on which a roller 17 is mounted. This roller 17 is designed to travel on a cam track 18, the said track being mounted for an up and down movement in guide channels 19 secured to one side of the press framework as best illustrated in Figs. 1, 2 and 3. In order to effect the requisite vertical movement of the track 18 so as to carry its entrance end into and out of alinement with the roller 17, I have provided bell cranks 20 and 21 which are connected to the track by links 22 and connected to each other by a link 23. The downwardly extending arm of the bell crank 21 is connected, by means of a rod 24, to a crank disk 25 mounted on one end of a shaft 26. The said shaft 26 carries a loose pinion 27 designed to be actuated by a mutilated gear or spaced segments 28 mounted on one end of the shaft 8, the pinion 27 being coupled to its shaft 26 by means of a clutch 29. Hence as the disk 25 is rotated, it is obvious that the connecting rod 24 will be moved in a direction to raise the track 18 at the correct time so that as the plunger moves forwardly, the roller 17 on the crank 16 will engage the track 18 imparting a partial revolution to the shaft 18.

The shaft 15 carries a segment 30 which meshes with a pinion 31 on the needle carrying shaft 32, the latter being journaled in the ram or plunger 14. Hence as the shaft 15 is turned as before described, the shaft 32 will also be given a partial rotation in a direction to carry the needles from a lowered inoperative position to an upper operative position so as to carry the wires upwardly over the rear end of the bale and to the twisting mechanism as presently described.

It is to be particularly noted that the needles designated 33 are mounted on their shaft 32 at a point to one side of the middle of the needles, so that when the needles are in lowered position, they will not project above the frame work of the press, but when they are swung around to an operative position they will project, as illustrated in dotted lines in Fig. 2, and in full lines in Fig. 12, and will be in a proper position to carry the wires into the twisting mechanism.

The wires designated 34 are fed from spools designated 35 journaled in hangers 36 depending from the press framework and are carried forwardly through guides 37 on the plunger 14 and also through eyes 38 formed in said plunger. They are then passed forwardly over rollers 39 carried by the then downwardly projecting ends of the needles 33 and secured to the wire holders hereinafter more specifically described. As the needles are swung around to the dotted line position illustrated in Fig. 2, by the means hereinbefore set forth, it is evident that the wires 34 will be carried upwardly along the rear side of the bale and loops will be formed in the wires as illustrated by the dotted lines in Fig. 2.

Each needle 33 carries at one end a pivoted finger 40 (see Figs. 4 and 5) spring pressed to the position illustrated in Fig. 4 and each finger 40 is formed with two notches or recesses designated 41 and 42. When the needles are being moved from their lowered position illustrated in Fig. 2 to the operative position projecting above the framework of the press as illustrated in dotted lines in such view, and in full lines in Fig. 12, the wire will first lie in the notch or recess 41, but as the needles are continued in their upward movement it is obvious that the finger 40 will yield to permit that portion of the wire 34 which has been carried in the recess 41 to pass rearwardly and form the return portion of the loop, as indicated in Fig. 5, while the other portion of the loop will lie in the recess 42 as also indicated in Fig. 5, and in dotted lines in Fig. 2. Each needle 33 is formed with stop lugs 40ᵃ between which the fingers 40 are mounted, whereby to limit the movement of the stop lugs in both directions, as clearly illustrated in Figs. 4 and 5. Now as the cam track 18 is raised and the plunger is moved forwardly and the needles swung around to an upward operative position, the wire will be carried to the twisting mechanism, when the plunger finally arrives at the baling end of the stroke, while on the return stroke the cam track 18 will force the crank 16 to reverse its movement so as to return the needles to their first or lowered inoperative position and the crank disk 25 will then be given the second one of its two one-half revolutions, so as to lower the track 18 below the roller 17, to permit the plunger to compress the material until the next bale is formed.

While the ram is at the baling end of its stroke with the needles up and the wires in the twisters 44, the twisters are rotated. In the present embodiment of the invention, these twisters are in the form of spur pinions, each with a radial slot 45 for the entrance of the two strands of wire to be twisted together, said slot being of a size to permit two wires to enter one after the other and preventing any passing of the wires in the slot and hence insuring that the wires will be twisted when the twisters are rotated. The twisters 44 are journaled in suitable bearings, on a portion of the press framework and their spur teeth mesh with corresponding teeth on the relatively large spur gears 46. These gears 46 are fast with bevel gears 47 which mesh with vertically disposed bevel gears 48, on a transversely extending shaft 49. This shaft 49 carries a bevel pinion 50 at one end, said pinion meshing with a corresponding pinion 51 on one end of an obliquely disposed shaft 52 extending substantially the full length of the press framework downwardly to the rear end thereof, as best illustrated in Figs. 1, 1ª and is provided at its rear end with a bevel pinion 53. This last named pinion meshes with a bevel pinion 54 on a shaft 55 which is journaled in the press framework in substantially transverse alinement with the shaft 26 before mentioned. The shaft 55 carries a loose pinion 56 which meshes with a mutilated gear or toothed segment 57 mounted on the before mentioned shaft 8. The loose pinion 56 is designed to be coupled with its shaft 55 by means of a clutch 58. It is intended that the clutches 29 and 58 be automatically set in operation when a requisite amount of hay or other material has been admitted into the press and I prefer for the automatic operation of the clutches 29 and 58, the automatic measuring mechanism described and claimed in Letters Patent of the United States #919,585 issued to me April 27, 1909. As this automatic mechanism is fully disclosed in said patent, it is not deemed necessary to again describe it here, particularly as other forms of clutch actuating means may be employed if desired so far as the present invention is concerned.

Returning now to the construction and operation of the twisters 44, it is to be understood that the twisters will be rotated as soon as the wires have been carried forwardly into the slots 45 by the needles 33. At the completion of the twisting operation the wires are cut off. One form of the cutting mechanism is illustrated in Figs. 6 and 7. The same comprises blades 59 carried by the respective gear wheels 46 each blade being arranged to sweep in a horizontal plane underneath a knife bar 60 secured to some stationary portion of the framework and over a cutting surface 61 which is in the form of a boss constituting an integral hub portion of the twister 44. Another form of cutting mechanism is illustrated in Figs. 8 and 9. In this modification, each twister 44 carries a laterally movable cutter 61ª arranged to be swept across the slot 45 and spring pressed to an inoperative position as shown, said cutter being actuated by means of a cam 62 carried by the gear wheel 46.

Prior to the initial operation of the press the wires 34 are threaded by hand through the guides 37 and eyes 38 and are carried upwardly and given several turns around the wire holders and waste wire drums 63. These wire holders and waste wire drums 63 are mounted on a transversely extending shaft 64 and occupy positions directly above the respective twisters 44. The wires after they are carried forwardly from the drums 63 are passed over pulleys 65 and then weights 66 are hung on them so as to prevent the wires from slipping on the peripheries of the drums. On the shaft 64 a disk 67 is mounted. This disk is formed with three sets of teeth 68 and intervening concave cam surfaces 69, the latter being arranged to engage with the periphery of an actuating disk 70 secured on the shaft 49. The disk 70 is provided with one set of teeth 71 designed to intermittently engage with one of the sets of teeth 68 at each revolution of the shaft 49 so as to impart an intermittent movement to the drums 63 in a direction to take up the twisted portion of the wires and carry the waste wire in a forward direction away from the press. It is clear that a portion of the wire after being cut off moves out with the bale, and these drums 63 will hold the remaining parts of the wire so that as the needles are moved downwardly, the wires will lie across the bed of the press underneath the material which is subsequently fed in preparatory to forming the next bale.

In order to permit the needles to yield while at the same time permitting the plunger to have a slight independent movement at the completion of its forward stroke, springs 72 are mounted in sockets in the plunger and bear against the rear edges of the needles when the latter are in their raised or operative position.

From the foregoing description in connection with the accompanying drawings, it is believed that the practical operation of my improved baling press is obvious. After the wires have been threaded through the guides 37 and eyes 38 as before described, and engaged with the wire holders and drums 63 as above mentioned, the feeder of the press is started and the body of the press packed with the material. After a requisite amount of hay or other material has been fed into the press, the clutches 29 and 58 are thrown in and thereupon on the forward movement of the plunger, the eccentric disk 25 will be first actuated to carry the cam track 18 upwardly into engagement with the roller 17, so that as the plunger moves forwardly to press the hay into a bale the shaft 15 will be given a partial rotation to swing the needles upwardly and carry the wire up to the rear side of the bale and then into the twisters. At the completion of the compressing operation, the mutilated gear 57 will actuate the rod 52 so as to operate the twisters and effect the twisting and cutting operations, at the completion of which the combined wire holders and drums 63 will be given a partial turn to carry the waste wire forwardly and hold the remaining portion of the wire between the bale and the holders until the next bale is formed. The shaft 15 will have a reverse motion imparted to it and carry the needles downwardly, and the plunger will move upwardly very much more quickly than it moved forwardly, so as to give more time for the feeder to act in packing the press preparatory to the formation of the next bale.

Having thus described the invention, what is claimed as new is:

1. In a baling press, a framework provided with a baling chamber, wire twisting mechanism, a plunger movable in said chamber, a shaft journaled in said plunger and provided with a crank, a wire feeding needle carried by said plunger and arranged to move across the rear face of the bale and carry the wire to the twisting mechanism in the movement of the plunger, the needle being operatively connected to said shaft to effect such movement of the needle by and upon the turning of the shaft, a cam track supported by said framework and arranged for engagement with said crank, bell cranks operatively connected to said cam track, a crank disk, means for turning said disk, and a pitman connection between said bell cranks and said disk arranged to move the track into and out of operative relation with the crank of said shaft.

2. A baling press, comprising a framework provided with a baling chamber, wire twisting mechanism, a plunger movable in said baling chamber, a needle through which the wire is designed to pass, said needle being arranged to carry the wire to the twisting mechanism by and upon the inverting of the needle to carry the wire across face of the bale, means for inverting the needle, and a pivoted finger carried by said needle and arranged to keep separate the two portions of the loop formed by inverting the needle.

3. A baling press comprising a framework provided with a baling chamber, wire twisting mechanism, a plunger movable in said baling chamber, a transverse shaft journaled in said plunger, needles mounted on the said shaft and through which the wires are designed to be passed, pivoted fingers carried by said needles at one end thereof, said fingers being arranged to keep separate the two portions of the loops formed by inverting the needles upon the partial rotation of the shaft carrying the same, and means for inverting said needles.

4. A baling press comprising a framework provided with a baling chamber, a plunger movable in said chamber to compress the material into a bale, twisting mechanism, and a needle arranged to swing so as to carry a wire to the twisting mechanism, said needle being provided with a roller over which the wire is designed to pass and a pivoted spring pressed finger also over which the wire is designed to pass substantially as described.

5. In a baling press, a framework provided with a baling chamber, means for compressing the material therein to form a bale, a needle movable in said chamber to carry a wire over the rear side of the bale, means for moving said needle upwardly, the needle being arranged to form a loop in the wire as the needle moves, and a pivoted spring pressed finger carried by the needle and formed with two recesses to hold the two strands of the loop separate from each other, substantially as described.

6. In a baling press, a wire feeding needle arranged to move in a direction to carry the wire across the rear face of the bale, and a pivoted finger carried by the needle and formed with a recess to receive the wire in one position of the needle preparatory to the movement of the needle in a direction across the rear face of the bale, said finger being arranged to form a loop in the wire in the movement of the needle, and adapted to snap back under tension and carry said recess rearwardly, said finger being also provided with another recess arranged in such movement to receive the other portion of the wire forming a loop substantially as described.

7. In a baling press a wire feeding needle formed with stop lugs and a pivoted finger carried by the needle between said stop lugs and spring pressed in one direction and formed with two separate recesses for the purpose specified.

8. In a baling press, a framework embodying a baling chamber, twisting mechanism, a plunger movable in said chamber and a wire feeding needle carried by said plunger and yieldable in a rearward direction and adapted to carry a wire to the twisting mechanism in the forward movement of the plunger, the yielding of the needle permitting a final forward movement of the plunger in the completion of its stroke independent of any forward movement of the needle.

9. In a baling press, a framework embodying a baling chamber, a plunger movable in said chamber, a transverse shaft journaled in said plunger, means for automatically turning said shaft upon the forward movement of the plunger, a pivoted segment mounted on said shaft, another shaft journaled in the plunger in advance of said first named shaft, a needle carrying arm mounted on said last named shaft, and a pinion secured to such last named shaft and meshing with said segment.

10. In a baling press, a framework embodying a baling chamber, a plunger movable in said chamber, a transverse shaft journaled in said plunger, a pivoted segment carried by said shaft, another shaft journaled in said plunger in advance of the first named shaft, a needle carrying arm mounted in said last named shaft, a pinion secured to said last named shaft and meshing with said segment, a crank arm secured to the first named shaft, and a cam track designed to engage said crank upon the forward movement of the plunger whereby to turn the crank shaft.

11. In a baling press, a framework provided with a baling chamber, twisting mechanism, a plunger movable in said baling chamber, a shaft journaled in said plunger and provided with a crank, a wire feeding needle carried by said plunger and arranged to swing across the rear face of the bale and carry the wire to the twisting mechanism in the forward movement of the plunger, the needle being operatively connected to said shaft to effect such movement of the needle by and upon the turning of the shaft, a vertically movable cam track supported by said framework and arranged for engagement with said crank, and means for raising said cam track into and out of operative relation with said crank as and for the purpose set forth.

12. In a baling press, wire twisting mechanism, a rotatable drum arranged to receive the waste wire from the twisting mechanism, a shaft upon which said drum is mounted, an intermittent gear wheel secured to said shaft and embodying toothed portions and intervening concave surfaces, a twister actuating shaft, and a gear wheel carried by the twister actuating shaft and formed with a single set of teeth adapted to successively engage the teeth of the intermittent gear wheel to effect a movement of said drum upon the completion of the twisting operation, the concave surfaces of said intermittent gear wheel riding upon the periphery of the gear wheel which is carried by the twister actuating shaft whereby to hold the intermittent gear wheel stationary until engaged by the teeth of the gear wheel which is carried by the twister actuating shaft.

13. In a baling press, wire twisting mechanism, a rotatable drum mounted above the same, and arranged to receive the waste wire therefrom, a twister actuating shaft, a pinion secured to said shaft, at one end, another pinion meshing with the first named pinion, a driving shaft carrying said last named pinion, means for imparting an intermittent rotary movement to said driving shaft to operate the twister actuating shaft, and an operative connection between said twister actuating shaft and the drum arranged to effect a movement of said drum upon the completion of the twisting operation.

14. In a baling press, twisting mechanism, and a combined wire holder and waste wire drum arranged contiguous to the twisting mechanism and arranged to receive the waste wire therefrom.

15. In a baling press, a twisting mechanism, a rotatable drum mounted above said twisting mechanism, and arranged to receive the waste wire therefrom, and means for imparting an independent movement to the drum at the completion of the twisting operation.

16. In a baling press, wire twisting mechanism, a rotatable drum mounted above the same and arranged to receive the waste wire therefrom, a shaft upon which said drum is carried, an intermittent gear wheel secured to said shaft, a twister actuating shaft, and a gear wheel carried by the twister actuating shaft and arranged to operatively engage the intermittent gear wheel and effect a movement of said drum upon the completion of the twisting operation.

In testimony whereof I affix my signature in presence of two witnesses.

GEORGE E. JACKSON. [L. S.]

Witnesses:
E. C. OGG,
JAS. J. KELLY.